United States Patent Office 3,423,404
Patented Jan. 21, 1969

3,423,404
(OPTIONALLY 17-ALKYLATED) ESTRA-4,9(10)-DIENE - 3α/3β, 17β - DIOLS AND ESTERS CORRESPONDING
Paul D. Klimstra, Northbrook, Ill., assignor to G. D. Searle & Co., Chicago, Ill., a corporation of Delaware
No Drawing. Filed Oct. 21, 1965, Ser. No. 500,186
U.S. Cl. 260—239.55        8 Claims
Int. Cl. C07c 173/00, 169/00

The present invention relates to novel steroidal diols characterized by unsaturated linkages at the 4(5) and 9(10) positions and, more particularly, to (optionally 17-alkylated) estra-4,9(10)-diene-3β,17β-diols and the corresponding esters represented by the following structural formula

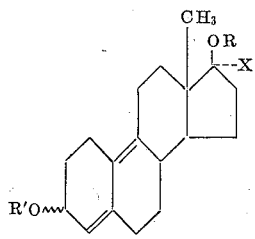

wherein R can be hydrogen or a lower saturated aliphatic acyl or tetrahydropyran-2-yl radical, R' is hydrogen or a lower saturated aliphatic acyl radical, X is hydrogen or a lower alkyl radical and the wavy line indicates the alternative α or β stereochemical configuration.

The lower alkyl radicals denoted by X in the foregoing structural representation are typified by methyl, ethyl, propyl, butyl, pentyl, hexyl, heptyl and the branched-groups isomeric therewith. The lower saturated aliphatic acyl radicals encompassed by R and R' can be lower alkanoyl radicals such as formyl, acetyl, propionyl, butyryl, valeryl, caproyl, heptanoyl, and the corresponding branched-chain isomeric groups or (lower cycloalkyl) (lower alkanoyl) radicals as exemplified by 3-cyclopentylpropionyl and 4-cyclohexylbutyryl.

The compounds of the present invention are conveniently obtained by utilizing as starting materials substances of the following structural formula

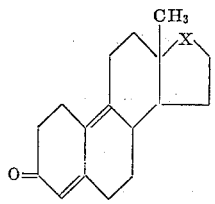

wherein X can be a carbonyl, β-hydroxymethylene or α-(lower alkyl)-β-hydroxymethylene radical. When those 3-keto compounds are contacted with a suitable reducing agent such as lithium tri-(tertiary-butoxy) aluminum hydride, lithium aluminum hydride or sodium borohydride, a mixture of the corresponding 3α and 3β-hydroxy compounds is produced. Those stereoisomers are conveniently separated by fractional crystallization. As a specific example estra-4,9(10)-diene-3,17-dione is contacted with lithium tri-(tertiary-butoxy) aluminum hydride in tetrahydrofuran to afford estra-4,9(10)-diene-3β,17β-diol together with estra-4,9(10)-diene-3α,17β-diol.

Reaction of the instant diols with a suitable acylating agent affords the corresponding instant esters. When estra-4,9(10)-diene-3β,17β-diol or 17α-methylestra-4,9(10)-diene-3β,17β-diol, for example, is contacted with acetic anhydride in pyridine, estra-4,9(10)-diene-3β,17β-diol 3,17-diacetate and 17α-methylestra-4,9(10)-diene-3β,17β-diol 3-acetate are produced. A process particularly suitable for manufacture of the instant estra-4,9(10)-diene-3β,17β-diol 3-monoesters involves conversion of the aforementioned estra-4,9(10)-diene-3,17-dione to the 17-cyanohydrin, i.e. 17-cyano-17-hydroxyestra-4,9(10)-dien-3-one, protection of the cyanohydrin moiety as by acetylation, thus producing 17-acetoxy-17-cyanoestra-4,9(10)-dien-3-one, reduction of the 3-keto group with lithium tri-(tertiarybutoxy) aluminum hydride by the procedure described hereinbefore to afford 17-cyanoestra-4,9(10)-diene-3β,17β-diol 17-acetate and cleavage of the acylated cyanohydrin moiety by reaction with aqueous sodium hydroxide in methanol to afford 3β-hydroxyestra-4,9(10)-dien-17-one. Acylation of the 3-hydroxy function followed by reduction of the 17-keto group affords the desired monoesters. 3β-hydroxyestra-4,9(10)-dien-17-one is thus contacted with acetic anhydride in pyridine to afford 3β-acetoxyestra-4,9(10)-dien-17-one, which is allowed to react with lithium tri-(tertiary-butoxy) aluminum hydride in tetrahydrofuran to yield estra-4,9(10)-diene-3β,17β-diol 3-acetate.

The instant estra-4,9(10)-diene-3β,17β-diol 17-monoesters are conveniently produced by esterification of the aforementioned 17β-hydroxyestra-4,9(10)-dien-3-one follower by reduction of the 3-keto group. Acylation with 3-cyclopentylpropionyl chloride thus yields the 17-(3-cyclopentylpropionate) which is allowed to react with lithium tri-(tertiary-butoxy) aluminum hydride in tetrahydrofuran to afford estra-4,9(10)-diene-3β,17β-diol 17-(3-cyclopentylpropionate). Reaction of 17β-hydroxyestra-4,9(10)-dien-3-one with dihydropyran in the presence of p-toluenesulfonic acid affords the corresponding 17-tetrahydropyran-2-yl ether, which is reduced, typically with lithium tri-(tertiary-butoxy) aluminum hydride in tetrahydrofuran, to afford the instant estra-4,9(10)-diene-3β,17β-diol 17-tetrahydropyran-2-yl ether.

The compounds of the present invention are useful in view of their valuable pharmacological properties. They are hormonal and anti-hormonal agents, for example, as is evidenced by their anabolic, androgenic, estrogenic and anti-estrogenic properties. In addition, they are anti-bacterial and anti-protozoal agents in consequence of their ability to inhibit the growth of such organisms as *Diplococcus pneumoniae* and *Tetrahymena gelleii*.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples temperatures are given in degrees centigrade (° C.) and quantities of materials in parts by weight unless otherwise noted.

Example 1

To a solution of one part of 17β-hydroxyestra-4,9(10)-dien-3-one in 22.5 parts of tetrahydrofuran is added, at 0–5° with stirring, a solution of 3 parts of lithium tri-(tertiary-butoxy) aluminum hydride in 22.5 parts of tetrahydrofuran. That reaction mixture is stirred for about 2 hours longer, after which time it is poured into a mixture of ice and water containing excess acetic acid. The precipitate which forms is collected by filtration, washed on the filter with water and dried in air to afford the crude product. Purification is effected by recrystallization from acetone, thus yielding pure estra-4,9(10)-diene-3β,17β-diol, melting at about 156–158°. This compound exhibits an ultraviolet absorption maximum at about 240 millimicrons with a molecular extinction coefficient of about 19,000 and is characterized further by the following structural formula

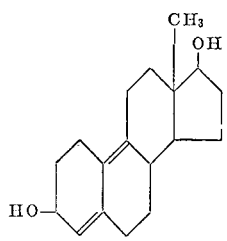

Example 2

To a solution of 4 parts of estra-4,9(10)-diene-3,17-dione in 54 parts of tetrahydrofuran is added, at 0–5° with stirring, a solution of 20 parts of lithium tri-(tertiary-butoxy) aluminum hydride in 54 parts of tetrahydrofuran. Stirring at that temperature is continued for about 1¾ hours, after which time the reaction mixture is poured into a mixture of ice and water containing excess acetic acid. The precipitate which forms is collected by filtration, washed on the filter with water and dried in air, then purified by recrystallization from acetone to yield estra-4,9(10)-diene-3β,17β-diol, identical with the product of Example 1.

The mother liquor from the latter acetone recrystallization is diluted with a large quantity of water, and the resulting precipitate is collected by filtration, then dried to afford estra-4,9(10)-diene-3α,17β-diol, melting at about 125–127.5° and characterized by an ultraviolet absorption maximum at about 249 millimicrons with a molecular extinction coefficient of about 26,750. This compound is represented by the following structural formula

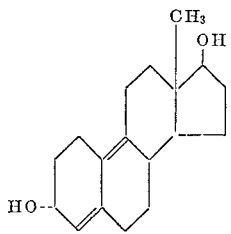

Example 3

A solution containing 1.2 parts of estra-4,9(10)-diene-3,17-dione, 1.12 parts of acetone cyanohydrin and 0.01 part of triethylamine is heated briefly to effect solution, then is allowed to stand at room temperature for about one hour. The resulting solidified mass is broken up and filtered. The filter cake is washed with hexane, then dried in air to yield 17-cyano-17-hydroxyestra-4,9(10)-dien-3-one, which is characterized by an ultraviolet absorption maximum at about 301 millimicrons with a molecular extinction coefficient of about 19,000 and also by infrared absorption peaks, in chloroform, at about 2.75, 3.38, 4.48, 6.01 and 6.21 microns.

Example 4

To a solution of 2 parts of 17β-hydroxy-17α-methylestra-4,9(10)-dien-3-one in 22.5 parts of tetrahydrofuran is added, with stirring and cooling at 0–5°, a solution of 6 parts of lithium tri-(tertiary-butoxy) aluminum hydride in 22.5 parts of tetrahydrofuran. The mixture is stirred for about 2 hours longer, then is poured carefully into an ice-water mixture containing excess acetic acid. Immediate extraction of that aqueous mixture with ether affords an organic layer, which is separated, washed successively with 5% aqueous sodium bicarbonate and water, dried over anhydrous sodium sulfate containing decolorizing carbon, then stripped of solvent by distillation under reduced pressure. The resulting glass-like residue is purified by recrystallization from acetone-hexane to afford 17α- methylestra-4,9(10)-diene-3β,17β-diol, melting at about 120–123°, and characterized also by an ultraviolet absorption maximum at about 250 millimicrons with a molecular extinction coefficient of about 20,000. This compound is characterized by the following structural formula

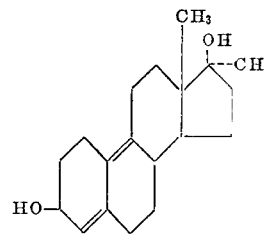

Dilution of the acetone-hexane mother liquor described in the foregoing paragraph with water results in formation of a precipitate, which is isolated by filtration and dried to afford 17α-methylestra-4,9(10)-diene-3α,17β-diol.

Example 5

A mixture of 2 parts of estra-4,9(10)-diene-3β,17β-diol, 12 parts of acetic anhydride and 25 parts of pyridine is stored at room temperature for about 16 hours, then is poured carefully into a mixture of ice and water. Extraction of the resulting aqueous mixture with ether followed by separation of the resulting two-phase system affords an organic solution, which is washed several times with water, then dried over anhydrous sodium sulfate containing decolorizing carbon. Removal of the solvent by distillation under reduced pressure affords an oily residue which solidifies upon standing to afford the crude product. Purification is effected by recrystallization from acetonehexane to produce estra-4,9(10)-diene-3β,17β-diol 3,17-diacetate. This compound is characterized further by an ultraviolet absorption maximum at about 250 millimicrons with a molecular extinction coefficient of about 18,500. Infrared absorption peaks are observed, in chloroform, at about 3.41, 5.78, 6.01 and 7.98 microns. This compound is represented by the following structural formula

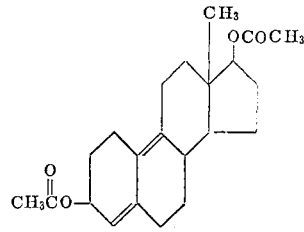

Example 6

To a solution of 1.3 parts of 17β-hydroxyestra-4,9(10)-dien-3-one in 20 parts of pyridine is added dropwise, over a period of several minutes, 2 parts by volume of 3-cyclopentylpropionyl chloride, and the resulting reaction mixture is stirred for about 45 minutes, then is poured into a mixture of ice and water. Extraction of the mixture with ether affords an organic solution, which is washed successively with dilute hydrochloric acid, dilute aqueous sodium bicarbonate, then dried over anhydrous sodium sulfate containing decolorizing carbon. The solvent is removed by distillation under reduced pressure, and the oily residue is purified by chromatography on silica gel followed by elution with 5% ethyl acetate in benzene, thus affording 17β-hydroxyestra-4,9(10)-dien-3-one 17-(3-cyclopentylpropionate). This compound exhibits an ultraviolet absorption maximum at about 303 millimicrons with a molecular extinction coefficient of about 17,800.

To a solution of 6.5 parts of 17β-hydroxyestra-4,9(10)-dien-3-one 17-(3-cyclopentylpropionate) in 270 parts of tetrahydrofuran is added, with stirring at 0–5°, 20 parts of lithium tri-(tertiary-butoxy) aluminum hydride. The resulting reaction mixture is stirred for about 2 hours, then is poured into ice and water containing excess acetic acid. Extraction with ether affords an organic solution, which is washed successively with water and dilute aqueous sodium bicarbonate, then dried over anhydrous sodium sulfate containing decolorizing carbon and concentrated to dryness by distillation under reduced pressure. The resulting glass-like substance is estra-4,9(10)-diene-3β,17β-diol 17-(3-cyclopentylpropionate), melting at about 42–45° and characterized by infrared absorption maxima, in chloroform, at about 3.38, 5.78, 6.01, 6.22 and 7.80 microns and also by the following structural formula

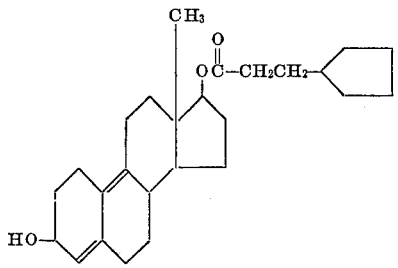

Example 7

To a solution containing 1.5 parts of 17β-hydroxyestra-4,9(10)-dien-3-one, 1.84 parts of dihydropyran and 16 parts of methylene chloride is added 0.003 part of p-toluenesulfonic acid monohydrate, and the resulting reaction mixture is stored at room temperature for about 20 hours. Dilution of the mixture with ether followed by washing successively with 5% aqueous sodium bicarbonate and water and drying over anhydrous sodium sulfate containing decolorizing carbon affords a solution, which is stripped of solvent by distillation under reduced pressure. The resulting orange oily residue is purified by adsorption on a neutral alumina chromatographic column followed by elution with 5% ethyl acetate in benzene to afford 17β - tetrahydropyran-2-yloxyestra - 4,9(10)-dien-3-one, which is characterized by an ultraviolet absorption maximum at about 303 millimicrons with a molecular extinction coefficient of about 15,000.

To a solution of 8 parts of 17β-tetrahydropyran-2-yloxyestra-4,9(10)-dien-3-one in 540 parts of tetrahydrofuran is added, at 0–5° with stirring, 25 parts of lithium tri-(tertiary-butoxy) aluminum hydride, and the resulting solution is stirred for about 4 hours longer. The mixture is then poured into ice and water containing excess dilute acetic acid, and the resulting acidic mixture is immediately extracted with ether. The ether layer is separated, washed successively with 5% aqueous sodium bicarbonate and water, then dried over anhydrous sodium sulfate containing decolorizing carbon and stripped of solvent by distillation under reduced pressure. The resulting glass-like product is estra-4,9(10)-diene-3β,17β - diol 17-tetrahydropyran-2-yl ether, which exhibits, in chloroform, infrared absorption maxima at about 2.75, 3.40, 6.02, 8.82 and 9.69 microns. This compound is represented by the following structural formula

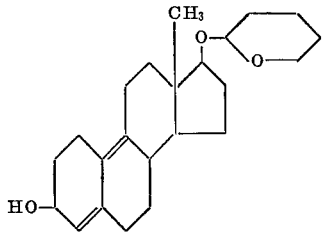

Example 8

When an equivalent quantity of estra-4,9(10)-diene-3β,17β-diol is substituted for 17β-hydroxyestra-4,9(10)-dien-3-one in the procedure of Example 6, there is obtained estra-4,9(10)-diene-3β,17β-diol 3,17-di-(3-cyclopentylpropionate).

Example 9

When an equivalent quantity of 17α - methylestra-4,9(10)-diene-3β,17β-diol is substituted in the procedure of Example 5, there is produced 17α-methylestra-4,9(10)-diene-3β,17β-diol 3-acetate.

Example 10

The substitution of an equivalent quantity of propionic anhydride in the procedure described in Example 5 results in estra-4,9(10)-diene-3β,17β-diol 3,17-dipropionate.

Example 11

When an equivalent quantity of 4-cyclohexylbutyryl chloride is substituted in the procedure described in Example 5, there is produced estra-4,9(10)-diene-3β,17β-diol 3,17-di-(4-cyclohexylbutyrate).

Example 12

When an equivalent quantity of 17α-ethyl-17β-hydroxyestra-4,9(10)-dien-3-one is reduced by the procedure described in Example 4, there is obtained 17α-ethylestra-4,9(10)-diene-3β,17β-diol.

What is claimed is:
1. A compound of the formula

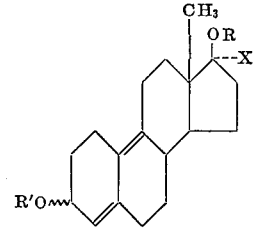

wherein R is selected from the group consisting of hydrogen, (lower cycloalkyl)-(lower alkanoly) and tetrahydropyran-2-yl radicals, R′ is a member of the class consisting of hydrogen and (lower cycloalkyl)-(lower alkanoyl) radicals and X is selected from the group consisting of hydrogen and a lower alkyl radical.

2. A compound of the formula

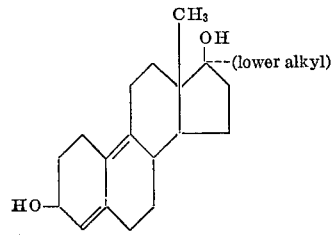

3. Estra-4,9(10)-diene-3β,17β-diol.
4. 17α-methylestra-4,9(10)-diene-3β,17β-diol.
5. Estra-4,9(10)-diene-3α,17β-diol.
6. Estra-4,9(10)-diene-3β,17β-diol 17-(3-cyclopentylpropionate).
7. Estra-4,9(10)-diene-3β,17β-diol 17-tetrahydropyran-2-yl ether.
8. 17β-tetrahydropyran-2-yloxyestra-4,9(10) - dien-3-one.

References Cited

UNITED STATES PATENTS

| | | | |
|---|---|---|---|
| 3,086,027 | 4/1963 | Perelman et al. | 260—397.3 |
| 3,170,923 | 2/1965 | Cross | 260—239.55 |
| 3,213,086 | 10/1965 | Cross | 260—239.55 |
| 2,843,608 | 7/1958 | Colton | 260—397.5 |
| 3,141,016 | 7/1964 | Wettstein et al. | 260—239.55 |
| 3,250,793 | 5/1966 | Fried | 260—397.5 |

HENRY A. FRENCH, Primary Examiner.

U.S. Cl. X.R.

260—397.4, 397.5, 999